No. 876,052. PATENTED JAN. 7, 1908.
U. HASKINS.
COUPLING.
APPLICATION FILED MAR. 4, 1907.
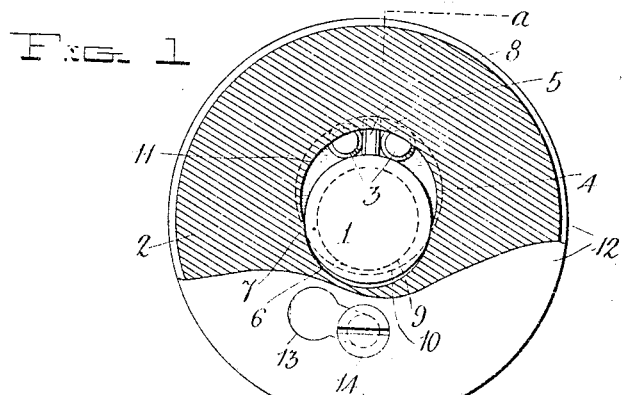
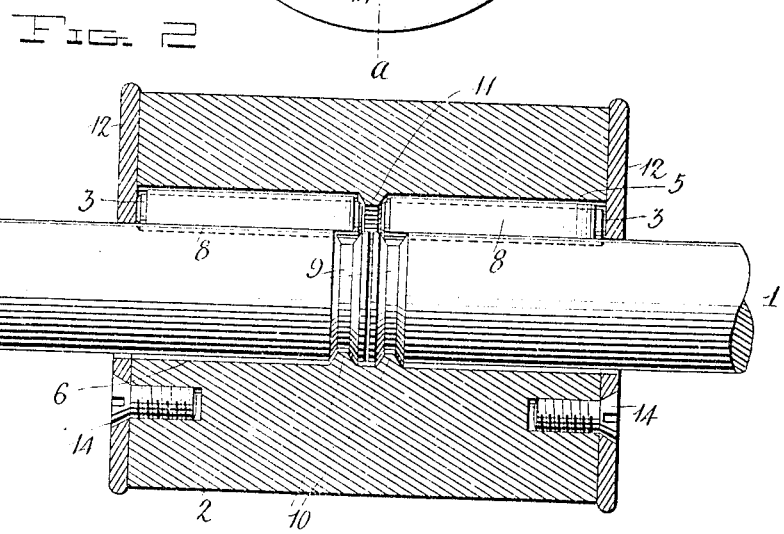
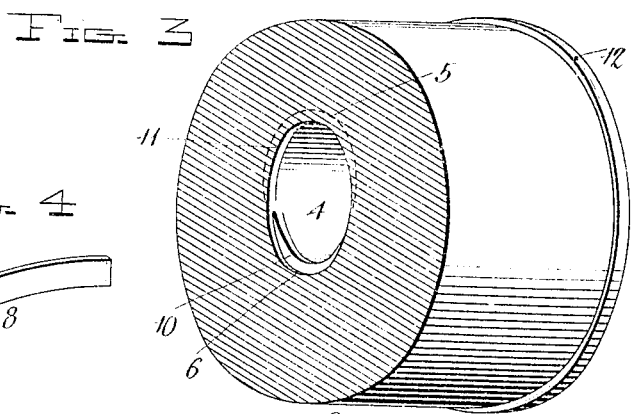
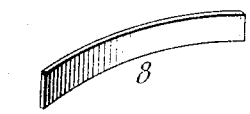
Witnesses
Inventor
Uri Haskins
by H. B. Willson & Co
Attorneys

UNITED STATES PATENT OFFICE.

URI HASKINS, OF CHATTANOOGA, TENNESSEE.

COUPLING.

No. 876,053.

Specification of Letters Patent.

Patented Jan. 7, 1908.

Application filed March 4, 1907. Serial No. 360,504.

*To all whom it may concern:*

Be it known that I, URI HASKINS, a citizen of the United States, residing at Chattanooga, in the county of Hamilton and State of Tennessee, have invented certain new and useful Improvements in Couplings; and I do declare the following to be a full, clear, and exact description of the invention, such as will enable others skilled in the art to which it appertains to make and use the same.

My invention is an improved coupling, which may be employed to couple the ends of shafts together, or to secure a wheel or other machine element on a shaft and comprises an element having an opening to receive a shaft, said opening presenting a cam surface to the shaft and also presenting a gripping or binding surface, and a wedging element in said opening between the shaft and the cam surface of the first-mentioned element to bind the shaft against the said binding or gripping surface, and it further consists in the construction, combination and arrangement of devices hereinafter described and claimed.

In the accompanying drawings,—Figure 1 is partly an end elevation and partly a transverse sectional view of a coupling embodying my invention; Fig. 2 is a longitudinal sectional view of the same, taken on the plane indicated by the line *a—a* of Fig. 1; and Fig. 3 is a sectional perspective view of the coupling element.

My invention comprises essentially a shaft 1, a coupling element 2 and wedging elements 3. The coupling element is here shown as a cylindrical sleeve for coupling the ends of the shafts 1 together. It may, however, constitute the hub of a wheel or a portion of a machine element, which it may be designed to lock on a shaft and I do not limit myself in this particular. The coupling element 2 has a longitudinal opening 4 to receive the shaft or shafts. The said opening is of irregular form presenting on one side a cam surface 5, opposed to a portion of the shaft and converging thereto in opposite directions and also presenting a binding or gripping surface 6 to enter a portion of the shaft, angles 7 being formed between said surfaces 5 and 6. I here show two wedging elements 3 in connection with each shaft and show such wedging elements as cylindrical rollers. The same are placed in the opening 4 between the cam surfaces 5 and the shaft, and the said wedging element on any attempt to turn either the element 2 or the shaft independently of the other will be forced by the cam surface 5 against the shaft and cause the latter to be forced against the gripping or binding surface 6, so that said element 2 will be effectually locked to the shaft. The pairs of rollers or wedging elements 3 are separated by bowed flat springs 8, which are disposed longitudinally between them and bear between the shaft and the cam surface 5 presented by the coupling element 2.

To lock the coupling element 2 against longitudinal movement on the shafts or either of them, such shaft or shafts is or are provided with an annular groove or grooves 9, and the coupling member is provided in its binding or gripping surface 6 with a flange or flanges 10 to enter said groove or grooves before the rollers 3 are inserted between the shaft or shafts and the cam surface 5. To prevent the rollers from moving longitudinally in one direction, the coupling element 2 is provided with a flange 11 in its cam surface 5, and to prevent them from moving in opposite directions, said coupling element is here shown as provided with detachable plates or caps 12, each of which has a key-shaped opening 13 to receive a similarly-shaped projection on the end of the coupling member, and a set-screw 14.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. In a device of the class described, a shaft, a member having a longitudinal bore to receive said shaft, said bore being eccentrically enlarged at one side of the shaft to form a space or chamber, a pair of wedging rollers arranged in said space, and adapted for frictionally holding the parts against relative rotation, springs disposed between the pair of wedging rollers, and cap plates removably attached to the ends of the member for retaining the wedging rollers in place.

2. In a device of the class described, a pair of shafts having marginal grooves, a coupling member arranged on the shafts and having a shaft-receiving bore provided with ribs to fit in said grooves, said bore being eccentrically enlarged at one side of the shafts to form a space or chamber, wedging rollers arranged in said chamber, springs disposed between the opposed faces of the wedging rollers, and cap plates detachably engaged with the ends of the coupling member.

In testimony whereof I have hereunto set my hand in presence of two subscribing witnesses.

URI HASKINS.

Witnesses:
  J. H. McLEAN,
  W. C. DICUS.